United States Patent [19]
Leonard

[11] Patent Number: 5,827,527
[45] Date of Patent: Oct. 27, 1998

[54] MEDICATED CANDY PRODUCT

[76] Inventor: Dana B. Leonard, 19007 Double Eagle Dr., Cornelius, N.C. 28031

[21] Appl. No.: 823,188

[22] Filed: Mar. 24, 1997

[51] Int. Cl.[6] ........................................ A61J 17/00
[52] U.S. Cl. .................... 424/440; 606/234; 606/235; D24/194
[58] Field of Search ................ 424/440; 606/234, 606/235; D24/194

[56] References Cited

U.S. PATENT DOCUMENTS

| | | | |
|---|---|---|---|
| D. 93,287 | 9/1934 | Reed . | |
| D. 323,417 | 1/1992 | Cacia | ........................... D1/102 |
| 1,971,560 | 8/1934 | Guyon | ................................ 99/16 |
| 2,824,561 | 2/1958 | Mueller | ............................... 128/252 |
| 3,289,986 | 12/1966 | Martin | ................................. 248/103 |
| 4,551,329 | 11/1985 | Harris et al. | ................... 424/22 |
| 5,123,915 | 6/1992 | Miller et al. | .................... 606/234 |
| 5,395,392 | 3/1995 | Suhonen | ............................ 606/234 |

*Primary Examiner*—Thurman K. Page
*Assistant Examiner*—Brian K. Seidleck
*Attorney, Agent, or Firm*—Adams Law Firm, P.A.

[57] ABSTRACT

A candy product includes a ring forming an annular handle, and having an outer diameter of at least 5 cm. A candy holder attached to the handle and adapted for carrying a lump of candy to be consumed by a child. The holder forms a paddle to pacify the child upon removal of the candy from the holder.

6 Claims, 3 Drawing Sheets

MEDICATED CANDY PRODUCT

TECHNICAL FIELD AND BACKGROUND OF THE INVENTION

This invention relates to a medicated candy product. The invention is especially intended for infants and young children who generally resist taking oral medication. The invention provides a safe and convenient means of administering medicine to the child, and includes a relatively soft, somewhat flexible paddle to pacify the child after the medicated candy is consumed.

One prior art medicated candy product is described in U.S. Pat. No. 4,551,329 to Harris. This product includes a handle formed from a resilient elongate stick looped into a single coil with the ends of the stick extending forwardly to define a pair of spring arms. Enlarged ears are formed on respective ends of the spring arms. The arms are moved together against the biasing force of the coil, and a piece of medicated hard candy molded around the ears. Should the candy separate from the ears in the mouth of the child, the spring arms are intended to spring apart to block entry of the handle into the throat.

This product, however, does not restrict entry of the attached candy into the mouth of the child and therefore may cause choking, especially in infants. Separation of the spring arms when in the mouth of the child may also injure the child. Moreover, after the arms spring apart, the free ends of the handle may be inadvertently forced down the throat of the child and cause choking.

The present invention overcomes these and other drawbacks of the prior art by providing a medicated candy product which includes a handle that cannot be forced into the mouth of the child and cause choking. The invention further provides a somewhat flexible paddle to pacify the child after the medicine is removed from the handle and consumed.

SUMMARY OF THE INVENTION

Therefore, it is an object of the invention to provide a medicated candy product which provides a safe and convenient means of administering medicine to the child.

It is another object of the invention to provide a medicated candy product which includes a relatively flexible paddle to pacify the child after the medicine is consumed.

It is another object of the invention to provide a medicated candy product which includes a handle that cannot be forced into the mouth of the child and cause choking.

These and other objects of the present invention are achieved in the preferred embodiments disclosed below by providing a medicated candy product including a somewhat flexible handle and candy holder. The candy holder is integrally-formed with the handle and adapted for carrying a lump of candy to be consumed by a child. The candy holder can function as a pacifier for pacifying the child upon removal of the candy from the holder.

According to one preferred embodiment of the invention, the handle is a ring.

Preferably, the ring and paddle are formed of PVC plastic.

According to another preferred embodiment of the invention, the holder forms a generally oval-shaped paddle.

Preferably, the candy product includes a ring forming an annular handle, and having an outer diameter of at least 5 cm. A candy holder is attached to the handle and adapted for carrying a lump of candy to be consumed by a child. The holder forms a paddle to pacify the child upon removal of the candy from the holder.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
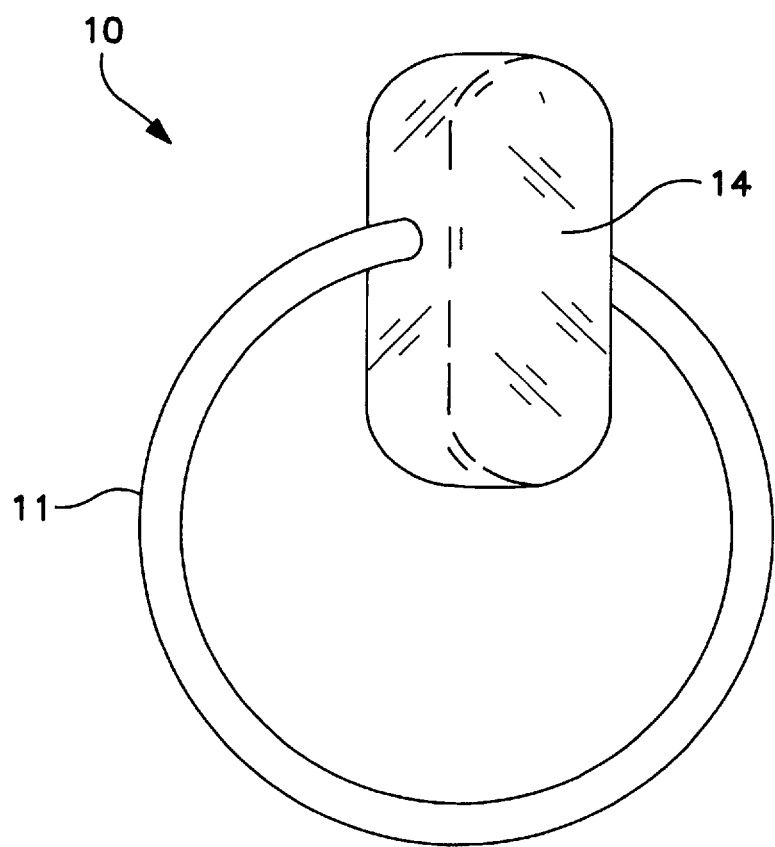
FIG. 1 is a perspective view of the medicated candy product according to one preferred embodiment of the invention.

Referring now specifically to the drawings, a medicated candy product according to the present invention is illustrated in FIG. 1 and shown generally at reference numeral 10. The product 10 is especially intended for infants and young children who generally resist taking oral medication.

The product 10 includes a handle 11 in the form of a ring having sufficient size and diameter to be comfortably gripped by the child. The circular shape of the handle 11 limits the entry of the product 10 into the mouth of the child to avoid any risk of choking or injury. According to one embodiment, the diameter measured from the outer periphery of the handle 11 is at least 5 cm. The diameter of the handle 11 itself is about 0.5 cm to 1 cm.

Figure 2:
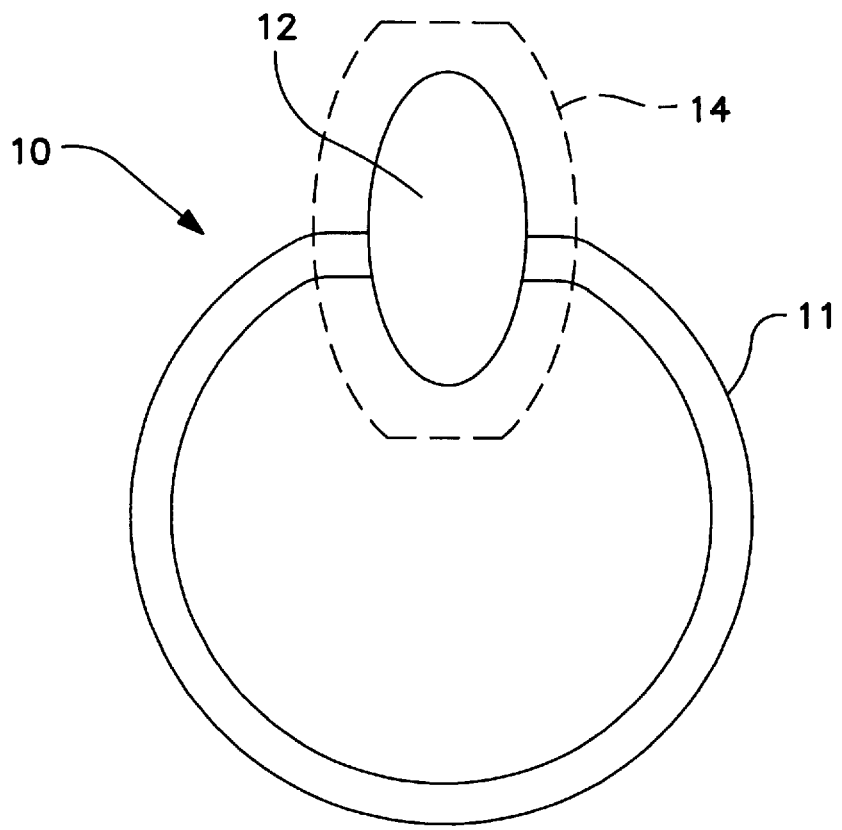
FIG. 2 is a front elevational view of the candy product.
Figure 3:
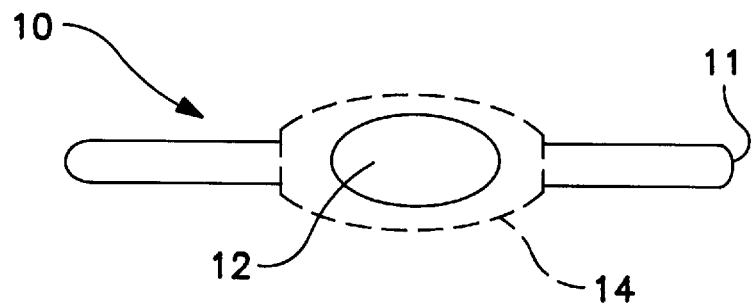
FIG. 3 is a top plan view of the candy product.
Figure 4:
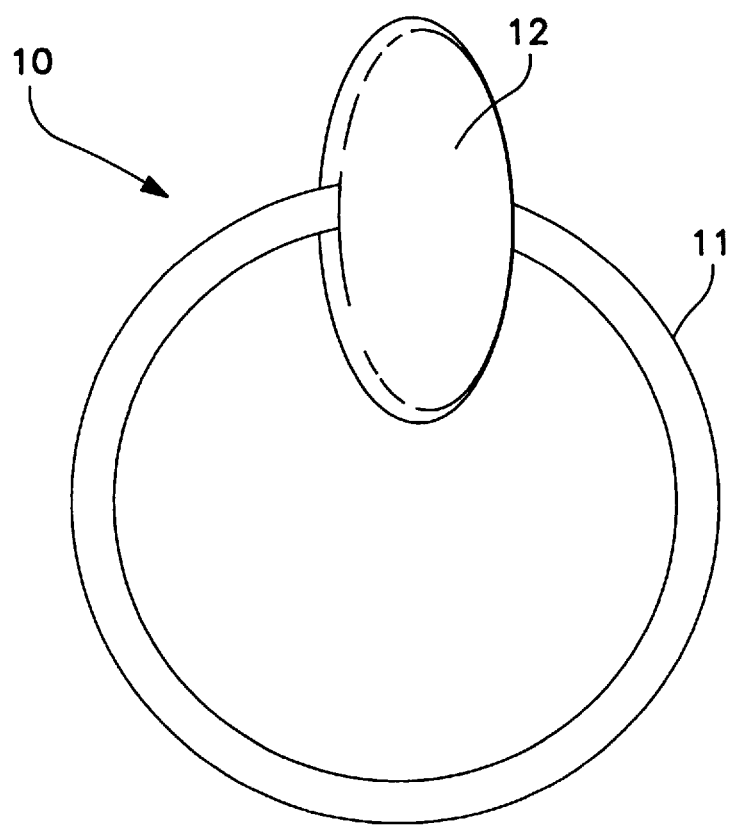
FIG. 4 is a perspective view of the medicated candy product with the candy removed from the holder.

As shown in FIGS. 2, 3, and 4, a candy holder 12 is integrally-formed with the handle 10 and adapted for carrying a lump of hard candy 14. The candy holder 12 and handle 10 are preferably formed of ABS plastic or a semi-rigid, relatively soft rubber material. The candy holder 12 defines a relatively flat oval-shaped paddle for being sucked on to pacify the child once the candy 14 is removed from the holder 12 and consumed. Because the holder 12 is permanently formed with the handle 11, it cannot be accidentally swallowed.

The medicated candy 14 is preferably a cough drop, throat lozenge, or the like, which is molded and hardened around the candy holder 12 to completely enclose the holder 12. The medicated candy 14 may be molded in the form shown in the drawings, or in the form of an animal or any other desired shape. The length of the candy holder 12 is preferably at least 3 cm. The length of the medicated candy 14 prior to being eaten is at least 4 cm. These dimensions and the dimensions of the handle are in compliance with pediatric guidelines to prevent accidental swallowing or choking.

In addition, the term "medicated candy" is defined broadly herein to include candy having an ingredient which may help treat a sore throat, a cold, the flu, or other aliment for which oral medication may be administered. Alternatively, the invention may include candy which contains no medicine ingredient.

A candy product is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I Claim:

1. A candy product, comprising:
   (a) a ring forming an annular handle, and having an outer diameter of at least 5 cm to prevent its entry into the mouth and throat of a child;
   (b) a candy holder integrally formed with the handle and adapted for carrying a lump of candy to be consumed by a child, said holder forming a paddle to pacify the child upon dissolution of the candy from the holder.

2. A candy product according to claim 1, wherein said handle is formed of plastic.

3. A candy product according to claim 2, wherein said candy holder is formed of plastic.

4. A candy product according to claim 1, wherein said candy holder comprises an oval-shaped paddle.

5. A candy product according to claim 1, wherein said handle is formed of rubber.

6. A candy product according to claim 5, wherein said candy holder is formed of rubber.

* * * * *